United States Patent [19]

Strub

[11] 3,802,152
[45] Apr. 9, 1974

[54] BANDING APPARATUS
[76] Inventor: Eric W. Strub, 12451 Santa Rosalina, Garden Grove, Calif. 92641
[22] Filed: July 12, 1973
[21] Appl. No.: 378,712

Related U.S. Application Data
[63] Continuation-in-part of Ser. No. 292,491, Sept. 27, 1972, abandoned.

[52] U.S. Cl............... 53/64, 53/133, 53/295, 53/296
[51] Int. Cl....... B67b 5/00, B65b 7/28, B65b 61/18
[58] Field of Search............ 53/291, 292, 295, 296, 53/297, 298, 389, 133, 136, 139.3, 176, 198 B, 64, 198 R; 83/89, 102, 112, 158, 160

[56] References Cited
UNITED STATES PATENTS

| | | |
|---|---|---|
| 2,579,458 | 12/1951 | Allen et al............... 53/291 X |
| 2,623,673 | 12/1952 | Holstein................... 53/291 |
| 2,751,735 | 6/1956 | Bartlett et al.............. 53/297 X |
| 2,760,321 | 8/1956 | Greer et al................ 53/292 |
| 2,771,725 | 11/1956 | Carter..................... 53/292 X |
| 2,846,835 | 8/1958 | Aguilar et al.............. 53/291 |

*Primary Examiner*—Travis S. McGehee
*Assistant Examiner*—Horace M. Culver
*Attorney, Agent, or Firm*—Fulwider Patton Rieber Lee & Utecht

[57] ABSTRACT

A banding apparatus for automatically cutting successive lengths of flat plastic sleeving from a supply spool and placing the cut bands on container necks for subsequent heat shrinking of the bands to seal the containers. The edge creases are removed from the flat sleeving just prior to cutting and the resultant cut bands are stacked in a guide chamber for successive placement on the containers as they come into position, the sleeve feeding, band cutting, band feeding and container advance being completely automatic. The cutting operation forms a tear tab in each band as it is cut.

13 Claims, 21 Drawing Figures

BANDING APPARATUS

CROSS-REFERENCE TO RELATED APPLICATION

The present application is a continuation-in-part of my copending patent application, Ser. No. 292,491, filed Sept. 27, 1972, and now abandoned, for "Banding Apparatus." The benefit of the earlier filing date is claimed for the subject matter common to both applications.

BACKGROUND OF THE INVENTION

1. Field of the Invention

The present invention relates to banding apparatus for cutting bands from flattened plastic sleeving made of heat shrinkable material, and for mounting such bands to containers for subsequent sealing thereof.

2. Description of the Prior Art

Various machines have been designed to automatically cut and mount lengths or bands of heat shrinkable plastic material onto containers for sealing purposes. Desirably the process is completely automatic so that an operator need only keep the machine supplied with the plastic material and assure that there is a constant flow of containers to be banded.

Different types of banding have been used, but the simplest and easiest to handle is plastic sleeving. Some machines of the prior art cut a supply of bands, with separate bands thereafter being drawn from the supply of cut bands as they are needed. Difficulties have arisen in orienting and picking up the individual bands for proper feeding and placement upon the containers. Overcoming these problems has resulted in rather complicated and expensive equipment.

It is better to utilize a continuous length of plastic sleeving, and cut bands from the sleeving for immediate mounting on the containers, rather than cut a supply of such bands for intermediate storage. Also, it is desirable to use flattened plastic sleeving because of the ease with which such flat material can be shipped and stored. However, there is presently no completely satisfactory equipment to meet these requirements simply and inexpensively.

STATEMENT OF THE INVENTION

According to the present invention, a banding apparatus is provided which quickly and automatically cuts flat plastic sleeving into bands, while contemporaneously pressing out the edge creases to form the bands into substantially cylindrical shape. The apparatus thereafter advances the bands for sequential mounting onto containers which the apparatus moves into position in timed relation with the other operations of the apparatus.

The crease-removing means comprises a pair of opposed pinch rollers which press the sleeving against a spherical element or ball located within the sleeving and rolling along its inner walls as the sleeving advances past the pinch rollers.

The cutting mechanism includes means adopted to form a tab integral with each band to facilitate tearing of the installed band by the user to gain access to the contents of the container sealed by the band.

The crease-removing means provides bands which are sufficiently uniform in cylindrical configuration that they are adapted for successive transport or pickup from the cutting station to the mounting station by a cylindrical mandrel movable in timed relation to container advance.

In one embodiment of the invention the sleeve feeding mechanism is controllable independently of the band transport mechanism, whereby the length of sleeve fed may be precisely adjusted without affecting the band transport operation.

The present apparatus includes a plurality of valves which are successively actuable to initiate operation of various portions of the apparatus to complete a work cycle. However, each successive valve can only be operated when the preceding portion of the work cycle has been completed. This eliminates uncoordinated operation of the various work cycle portions.

Other objects and features of the invention will become apparent from consideration of the following description taken in connection with the accompanying drawings.

DESCRIPTION OF THE PREFERRED EMBODIMENTS

Referring now to the drawings, and particularly to FIGS. 1–10, there is illustrated an automatic banding apparatus 20 comprising, generally, a forming means or apparatus 22 for opening a flattened banding sleeve 24 and flattening the edge creases; a guide assembly 26 for receiving cut lengths of sleeve 24; a feed means 28 actuable to advance a predetermined length of the sleeve 24 from the forming apparatus 22 to a position laterally adjacent the guide assembly 26; cut-off means 30 actuable to cut a predetermined length of the sleeve 24 and transport it into position within the guide assembly 26; transport means 32 actuable to engage and advance the cut lengths from the guide assembly 26 for mounting upon a container 34 or the like; and control means 36 to establish the sequential and coordinated operation of the various banding apparatus components necessary to complete a banding work cycle.

As will be seen, the banding apparatus 20 cuts lengths or bands 38 of the banding sleeve 24 and sequentially mounts bands 38 upon sequentially advanced containers 34. The apparatus 20 includes container transport apparatus 40, as best seen in FIGS. 11–14, which is operative to move the containers 34 past the mounting station where the bands 38 are placed in overlying relation to the caps and necks of the containers. Thus, for example, the container may be a wine bottle, in which case the band 38 overlies the joint between the screw cap and the bottle neck and provides an air-tight seal.

The material of the banding sleeve 24 is preferably made of any of the well known heat-shrinkable plastics. Bands 38 of such material shrink onto the containers 34 when the containers are transported through a conventional heating tunnel or the like (not shown).

Figures 1, 2, 3, 4:
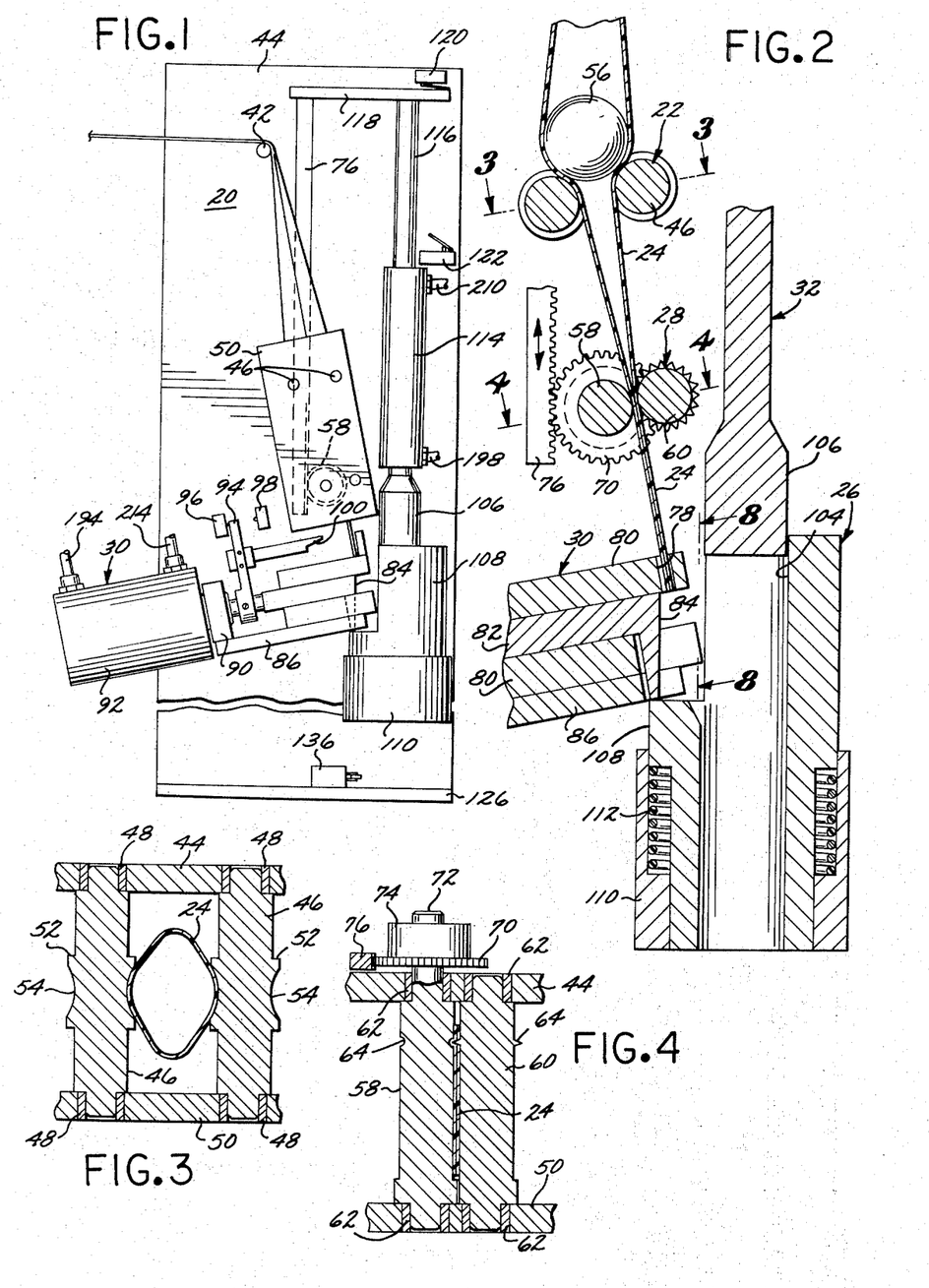
FIG. 1 is a front elevational view of banding apparatus according to the present invention, the container feed mechanism being omitted for brevity in this particular showing.
FIG. 2 is an enlarged longitudinal cross-sectional view of the sleeve feed, band cutting, and band advance or feed mechanisms.
FIG. 3 is an enlarged view taken along the line 3—3 of FIG. 2.
FIG. 4 is an enlarged view taken along the line 4—4 of FIG. 2.

In the present apparatus 20, the sleeve 24 is in the form of an endless length of flattened sleeving wrapped upon a supply drum or spool (not shown) from which it is drawn as needed. As best seen in FIGS. 1 and 2, the sleeve 24 passes from the supply drum, over a guide roller 42 mounted to a frame back plate 44, and then downwardly between a pair of spaced apart pinch rollers 46.

The rollers 46 are rotatable about axes extending transversely of the sleeve path, as seen in FIG. 3. The rollers 46 include reduced diameter end portions carried within suitable bearings 48 pressed into openings which are provided in the frame back plate 44 and in a confronting mounting plate 50. The plate 50 is secured by suitable fasteners (not shown) upon and in spaced relation to the front of the plate 44.

Each pinch roller 46 includes a cylindrical central portion 52 characterized by a circumferentially continuous concavity 54 which engages an edge crease of the flattened sleeve 24.

As best seen in FIG. 2, a spherical element or ball 56, having a diameter greater than that of the space between the confronting pinch roller concavities 54, is located within the hollow interior of the sleeve 24 and slides or rolls downwardly under the force of gravity, resting against the roller portions 52, and pressing the sleeve located therebetween. The diameter of the ball 56 closely conforms to the radius of curvature of the concavities 54 so that the pinched or creased edges of the sleeve 24 are substantially pressed out as they pass between the ball 56 and the rollers 46. Consequently, the sleeve 24 tends to assume a substantially cylindrical configuration.

Below the pinch rollers 46, the sleeve 24 passes between a pair of feed rollers 58 and 60 which form a part of the feed means 28 to feed a predetermined length of the sleeve 24 to the cut-off means 30. The rollers 58 and 60, like the pinch rollers 46, rotate within suitable bearings 62 which are press-fitted within openings provided in the confronting plates 44 and 50.

The feed roller 58 includes a plurality of circumferentially spaced indentations 64 which complementally receive a corresponding plurality of projections or points 64 carried upon the periphery of the feed roller 60. The points 64 form a plurality of openings or serrations 66 parallel to the longitudinal axis of the band 38, as best viewed in the band embodiment located to the left in FIG. 10. The serrations 66, in combination with an upwardly projecting tab 68 provided on the band 38, facilitate removal of the band 38 from the sealed container. The tab 68 is grasped by the user and pulled downwardly to tear the band 38 along one or the other of the line of serrations 66. The formation of the tab 68 is described subsequently.

As best seen in FIG. 4, a gear 70 mounted upon one end 72 of the feed roller 58 cooperates with a conventional one-way clutch 74 mounted upon the roller end 72. In one direction of rotation of the gear 70 the clutch 74 locks the gear 70 to the end 72 so that rotation of the gear 70 is accompanied by rotation of the end 72. In the opposite direction of rotation of the gear 70, the gear slips upon the end 72 and no rotation of the roller 58 occurs.

As best seen in FIG. 2, the gear 70 is rotatable by a vertically extending gear rack 76. When the rack 76 is moved downwardly, the gear 70 slips relative to the roller 58, and the sleeve 24 held between the feed rollers 58 and 60 does not move. However, when the gear rack 76 moves upwardly, the roller 58 is rotated in a clockwise rotation of the roller 60. This feeds a length of the sleeve 24 in a downward direction, as seen in a comparison of FIGS. 2 and 5. The length of sleeve fed is determined by the length of the stroke of the rack 76.

The feed stroke of the feed means 28 moves a predetermined length of the banding sleeve 24 downwardly through a slot 78 provided in the upper one of a pair of spaced apart, confronting plates or ways 80 which are suitably attached, as by bolts or the like, to the frame back plate 44. A cut-off blade 82 is slidable between the ways 80, and includes a sharp upper edge extremity adapted to shear off the sleeve 24 at the lower terminus of the slot 78. The end portion of the blade 82 includes a vertical end face 84 of the blade 82 which is adapted to engage the cut off portion of the sleeve 24 and transport it laterally to a position within the guide assembly 26, as will be seen. In addition, the downwardly extending end portion of the blade 82 defining the end face 84 acts as a stop. It engages complemental end faces of the lower ways 80 and a support plate 86 to limit the extent of blade movement away from the guide assembly 26.

Figures 7, 8, 9, 10:
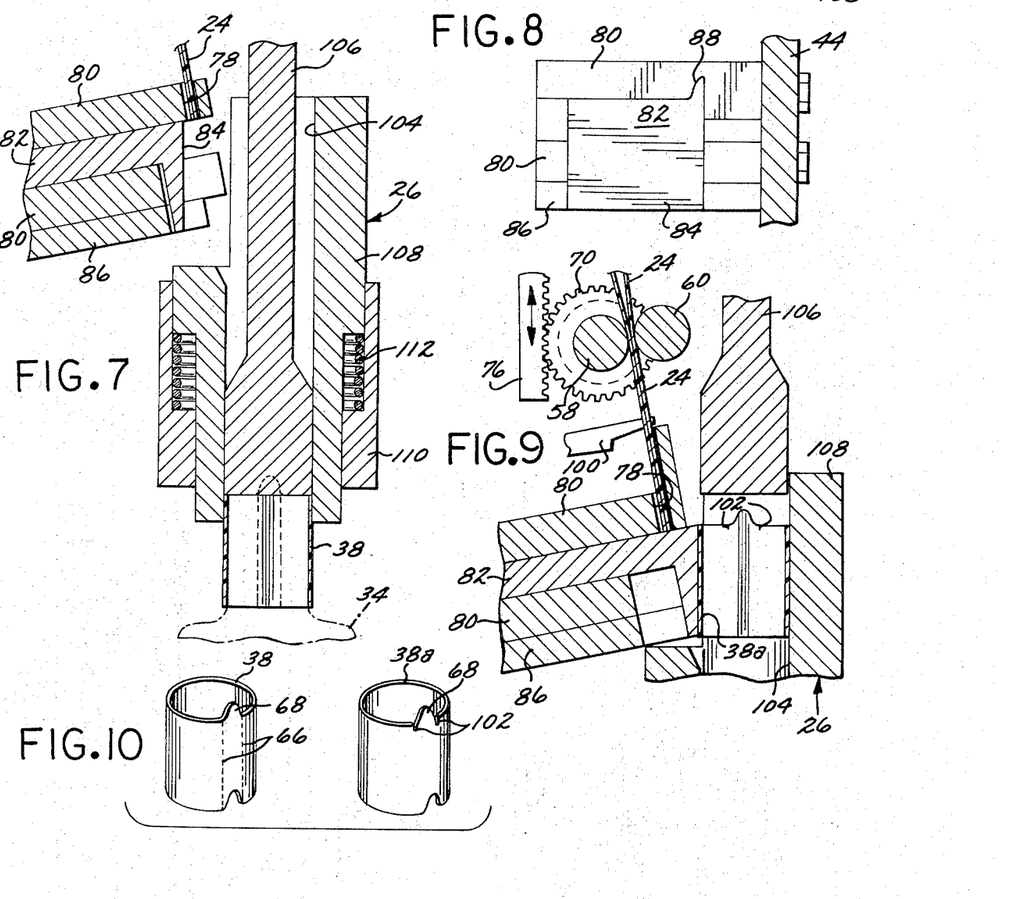
FIG. 7 is a view similar to FIG. 6, but showing the band transported out of the guide chamber in position for mounting onto and over the cap and neck of a container.
FIG. 8 is a view taken along the line 8—8 of FIG. 2.
FIG. 9 is a view similar to FIG. 6, but showing the use of an auxiliary cutter to form weakened areas or notches at the sides of the tear tab of each band, such a tab structure being shown at the right in FIG. 10.
FIG. 10 is a perspective view of a pair of bands, showing the two types of tear tabs which can be formed with the present apparatus.

The upper edge corner of the cut-off blade 82 includes an integral cutting portion or ear 88 slidable within a complemental slot formed in the upper ways 80, as best viewed in FIG. 8. The ear 88 is half arcuate, half straight so that in cutting the flattened sleeve 24 into a band 38 at the fold line, the tab 68 is defined when the flattened band 38 is opened into a substantially cylindrical configuration.

The support plate 86 is attached to the lower ways 80 by suitable fasteners (not shown) and extends to the left, as viewed in FIG. 1, where it is attached to an end bushing 90. The bushing 90 slidably carries the piston of a double-acting air cylinder 92 and thereby supports the cylinder in position. The cylinder 92 is part of the cut-off mechanism 30 and its piston is attached to the cut-off blade 82 to effect back and forth movement of the blade.

Adjacent the blade 82 the piston of the cylinder 92 carries an upwardly extending bracket 94. The upper extremity of the bracket 94 moves between a pair of limit switches 96 and 98, forming part of the control means 36, as the cut-off blade 82 is moved back and forth. The switches are secured to the frame back plate 44 and are engageable by the bracket 94 to establish the extent of movement of the blade 82 in response to actuation of the cylinder 92.

In a second embodiment of the present invention, the portion of the bracket 94 located immediately below the switches 96 and 98 carries a supplemental blade 100. As best seen in FIGS. 9 and 10, the blade 100 is operative to cut a notch 102 in the flattened sleeve 24 at the same time as the portion of the sleeve 24 located beneath it is being cut off by the cut-off blade 82. The band 38a formed in this way is characterized by structurally weakened portions on each side of the tab 68, as seen in FIG. 10. The notches 102 facilitate ripping away of a portion of the band 38 to break the seal. The notches 102 may be provided in addition or as an alternative to the serrations 66. If the notches 102 are not desired the blade 100 is simply removed from the bracket 94. If the serrations 66 are to be omitted, the serration points 64 are omitted and suitable friction feed surfaces (not shown) are used instead, as will be apparent.

The guide assembly 26 includes an internal, generally cylindrical, and vertically elongated guide chamber 104 which opens at the side to the cut-off blade 82. As best seen in the sequence of views in FIGS. 2, and 5-7, the cut-off blade 82 is operative to engage each cut band 38 and carry it into the guide chamber 104. The diameter of the chamber is substantially the same as that of the band 38 so that the band 38 tends to engage the walls of the chamber and stay in its inserted position. The action of the pinch rollers 46 and the ball 56, as well as the action of the feed rollers 58 and 60, tends to cause each band 38 to assume a substantially cylindrical configuration at this time.

Figures 5, 6:
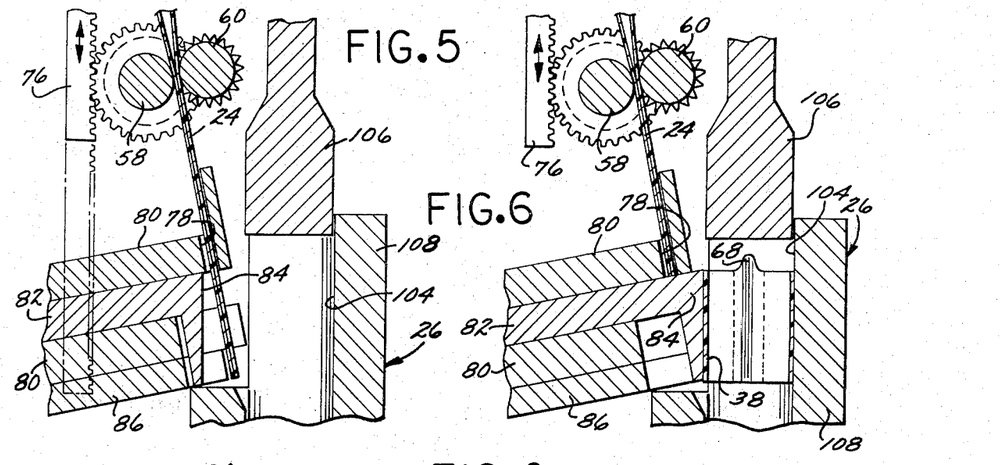
FIG. 5 is a view similar to FIG. 2, but showing the sleeving advanced just prior to cut-off.
FIG. 6 is a view similar to FIG. 5, but showing the freshly cut band located in the guide chamber after cut-off.

On retraction of the cut-off blade 82, a vertically reciprocable transport piston 106 is downwardly movable to pick up the inserted band 38 for downward transport. The piston 106 is vertically slidable within the chamber 104 and its lower face engages the upper portion of each band 38 and, on completion of tis downward stroke, carries the band out of the lower end of the guide chamber 104, as best seen in FIGS. 6 and 7.

The chamber 104 is defined by an inner guide 108 which is vertically slidable within the central opening of an outer guide sleeve 110 secured to the frame back plate 44. A compression spring 112 interposed between the sleeves 108 and 110 biases the sleeve 108 upwardly to the position illustrated in FIG. 2. When the transport piston 106 moves downwardly, its frictional engagement with the walls of the chamber 104 is sufficient to overcome the bias of the spring 112 and move the guide sleeve 108 downwardly into light contact or engagement with the upper edge of the neck of the container 34, as seen in FIG. 7. This facilitates placement of the band 38 onto the container neck by the descending piston 106. If desired, the two-part construction of the guide assembly 26 can be omitted, and the lower end of the sleeve 108 instead be located closely proximate the container top, but the two-part construction tends to more reliably effect proper band placement on the containers.

The piston 106 is actuable by a double-acting air cylinder 114 secured to the frame back plate 44. The cylinder 114 includes not only the piston 106, but also an upwardly extending piston 116 movable in common with the piston 106. The upper extremity of the piston 116 is attached to one end of an elongated, transversely extending support bracket 118. The opposite end of the bracket 118 is attached to the upper end of the gear rack 76. With this arrangement, upward movement of the transport piston 106 is accompanied by upward movement of the gear rack 76. Consequently, whenever the piston 106 moves upwardly after completing a band mounting operation upon a container 34, the corresponding upward movement of the gear rack 76 effects feeding of a fresh length of sleeve 24 to the cut-off assembly 30 for cut-off a moment later.

Upper and lower limit switches 120 and 122 are attached to the frame back plate 44, as best seen in FIG. 1, and are engagable by the bracket 118 as it moves between its upper and lower positions. As will be seen, the switches 120 and 122 initiate operation of other components of the apparatus 20 in coordination with completion of the sleeve-feeding and band mounting portions, respectively, of the work cycle.

Referring now to FIGS. 11-14, the container transport apparatus 40 which is operative to sequentially advance the containers 34 to the band mounting station is located beneath the guide assembly 26. The containers 34 are supplied to and carried away from the apparatus 40 by any suitable means. For brevity, a supply or conveyor belt 124 is illustrated only in part, being movable in the direction of the arrows. As will be apparent, the belt 124 brings capped containers 34 into engagement with the apparatus 40, and carries the sealed containers 34 away from the apparatus 40. The containers 34 are preferably then carried by the belt 124 through a heat tunnel or the like (not shown) which is operative to shrink the freshly mounted bands 38 onto the containers 34.

The apparatus 40 is mounted in any suitable manner beneath the portions of the banding apparatus 20 thus far described. Thus, a pair of idler sprockets 128 are mounted upon a horizontal table or plate 126 for free rotation about generally vertical axes. An endless conveyor chain 130 is trained about the sprockets 128 and pivotally mounts a plurality of container-receivers 132 which are each characterized by an outwardly opening concavity configured to closely receive the cylindrical exterior of a container 34.

Figure 11:
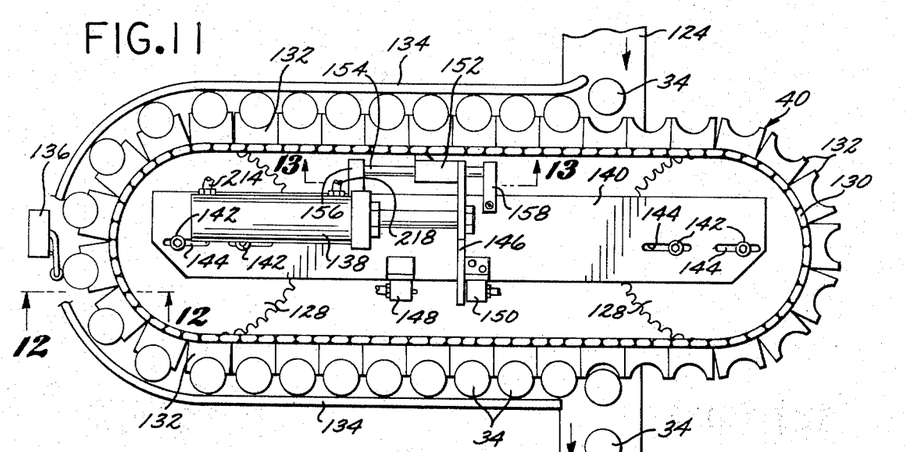
FIG. 11 is a plan view of the container feed apparatus which was omitted in the showing of FIG. 1.
Figure 12:
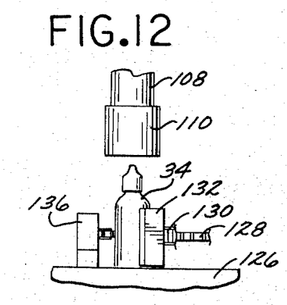
FIG. 12 is a view taken along the line 12—12 of FIG. 11.
Figure 13:
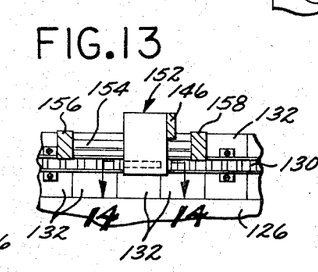
FIG. 13 is a view taken along the line 13—13 of FIG. 12.

A curved retainer-barrier 134 is disposed outwardly of the container-receivers 132 and extends completely around the path of travel of the containers from the supply belt 124, to the band mounting station, and back to the supply belt 124. The barrier 134 prevents the containers from coming out of the container-receivers 132, except at the point of discharge of the containers back onto the belt 124. The band mounting station is defined as the area beneath the guide assembly 26, and this is located in the present instance immediately adjacent the switch 136, as seen in FIGS. 11 and 12.

Periodic advancement of the plurality of container-receivers 132 for successive positioning of the containers 34 at the band mounting station below the assembly 26 is accomplished by a double-acting air cylinder 138 which is rigidly mounted to a horizontally extending mounting plate 140. The plate 140 is secured above the table or plate 126 in spaced relation to the sprockets 128 by bolts 142 or the like which extend through elongated transverse slots 144 provided in the plate 140. The bolts 142 thread into the stationary central bushings about which the sprockets 128 rotate. This arrangement permits the plate 140 to be laterally shifted relative to the chain receivers 132 to thereby precisely locate a container 34 at the band mounting station at the end of an advancing stroke of the cylinder 138.

The piston cylinder 138 mounts a transversely elongated bracket 146, one end of which is alternatively engagable with one or the other of a pair of spaced apart limit switches 148 and 150 which are secured in position by attachment to the plates 140. The opposite end of the bracket 146 rigidly mounts a chain engagement mechanism 152 for advancing the chain 130.

The mechanism 152 includes a central bore (not shown) which axially slidably receives a rod 154 whose opposite ends are rigidly attached to a pair of spaced mounts 156 and 158 bolted to the plate 140. The rod 154 guides the longitudinal travel of the mechanism 152 during a reciprocal movement of the piston rod of the cylinder 138.

Figure 14:
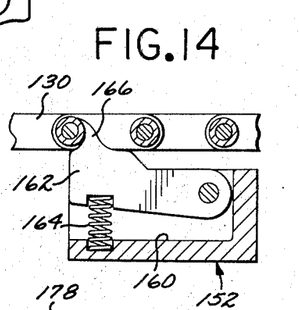
FIG. 14 is a view taken along the line 14—14 of FIG. 13.

As best seen in FIG. 14, the mechanism 152 also includes a cavity 160 within a pawl 162 is pivotally mounted. A compression spring 164 is interposed between the pawl 162 and the adjacent wall of the cavity 160 to bias the pawl 162 outwardly. This urges an arcuate forward face 166 of the pawl 162 into successive engagement with links of the chain 130. The face of the pawl 162 opposite the face 166 is rounded so that it slides or ratchets under each chain length during retraction movement of the mechanism 152 to the right, as viewed in FIG. 11.

Actuation of the air cylinder 138 in one direction causes the bracket 146 to move to the left, in a feed stroke. This causes the pawl 162 to engage one of the chain links of the chain 130 and advance the chain a predetermined distance, as dictated by the position of the mount 156. Each such feed stroke advances a successive container 34. On completion of the feed stroke, switch 148 is actuated and other components of the banding apparatus 20 then come into operation, as will be seen.

On the retraction stroke of the piston rod of cylinder 138, the pawl 162 disengages the chain link with which it was previously associated, and is biased inwardly under the next adjacent chain link for engagement thereof on the next feed stroke. Upon completion of the retraction stroke the bracket 146 engages switch 150 to effect operation of other portions of the apparatus 20, as will be seen.

Figure 15:
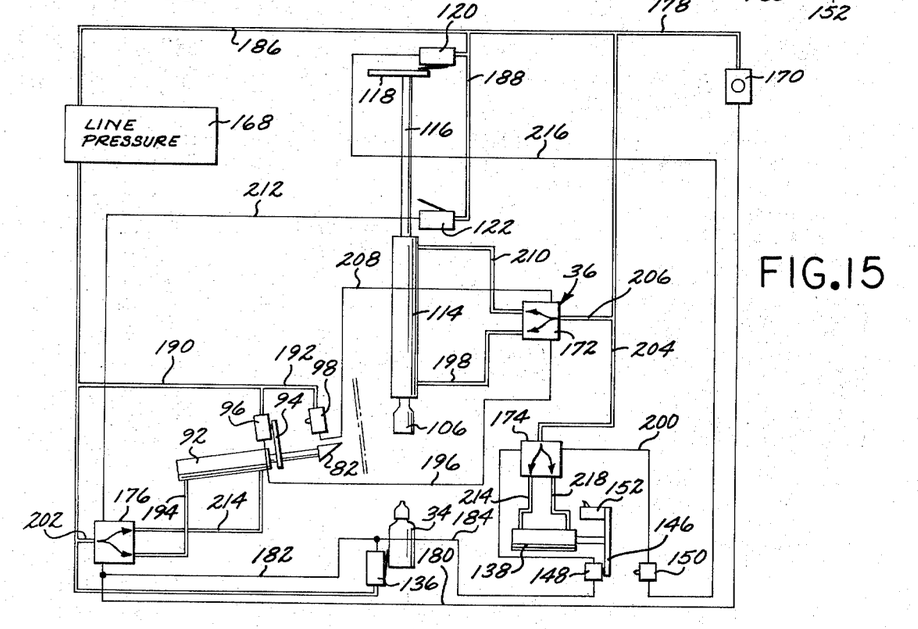
FIG. 15 is a diagrammatic view of the control system for coordinating the operation of the various portions of the apparatus associated with the different parts of the work cycle.

Referring now to FIG. 15, the overall operation of the banding apparatus 20 will be described, particularly the interaction and cooperation of the apparatus components under the control of the control means 36.

On start-up of the apparatus 20, line pressure from a suitable compressed air source 168 is applied to the supply valve 136. The valve 136, like the other valves mentioned herein, other than the shuttle valves, is effective, when engaged and thereby opened, to allow air to pass. The type of valve mechanism is not important to the present invention. It may be a mechanical valve which is indirectly operated through engagement of an associated electrical switch, as will be apparent to those skilled in the art.

If the valve 136 engaged by a container 34 located at the band mounting station below the guide assembly 26, line pressure passes through the valve 136 and is applied through a line 182 to the shuttle of the valve 176. Air under pressure is also applied to the valve 148 through a lead 184.

If there is no container 34 in engagement with the valve 136, line pressure to the valves 176 and 148 is supplied by manually actuating the start valve 170, which is connected in parallel with the line 182.

Whether applied by actuation of valve 136 or valve 170, the pressure to the shuttle of the valve 176 is "pilot" pressure, effective only to operate or move the internal shuttle valve. The main line pressure to the valve 176 is applied through a line 202 and is routed one way or the other, according to the position of the shuttle. At this time pressure is also applied to valve 120 through a line 186; to valve 122 through a line 188; to valve 96 through a line 190; to valve 98 through a line 192; to shuttle valve 174 through a line 204; and to shuttle valve 172 through a line 206.

With the foregoing arrangement, pilot pressure from line 182 acts upon the shuttle of the valve 176 and moves the shuttle to route air under pressure from line 202 and through a line 194 to one end of the cut-off cylinder 92. This causes cut-off blade 82 to move outwardly and cut a band 38 from the banding sleeve 24. This movement of blade 82 continues until bracket 94 engages and opens valve 98. This allows air to pass through valve 98, through a line 208, to the shuttle of valve 172, moving the shuttle so that line pressure from line 206 passes from the shuttle valve 172 through a line 210 to the top of the transport cylinder 114. This moves the transport piston 106 downwardly, picking up the freshly cut band 38 and moving it downwardly. In addition, previously cut bands 38 located within the guide chamber 104 are also moved downwardly, the lowermost one of such bands being pushed onto the cap and neck of the container 34 located below the guide assembly 26.

Upon completion of downward movement of the piston 106, bracket 118 engages and opens the valve 122, which routes pressure through a line 212 to the shuttle of the valve 176. This routes air through a line 214 to the cylinder 92 to retract the cut-off blade 82.

When the retraction stroke of the cut-off blade 82 is completed, the bracket 94 engages and opens valve 96, which allows air to pass through a line 196 to the shuttle of the valve 172, routing air from the line 206 through a line 198 to the bottom end of the transport cylinder 114. This causes the transport piston 106 to move upwardly in a retraction stroke. Simultaneously, the gear rack 76 connected to the bracket 118 causes the feed means 28 to downwardly advance a length of the banding sleeve 24 for the next cut-off operation.

At the same time air passes through line 182 to actuate the cutting movement of blade 82, air also passes through line 184 and through valve 148 to actuate the shuttle of the valve 174. This causes air to pass through line 204 and through a line 214 to container transport cylinder 138. As a consequence, bracket 146 and mechanism 152 move through a retraction stroke until bracket 146 engages and opens valve 150. However, pilot pressure cannot pass through valve 150 at this time because valve 120 of the transport means is not opened by the bracket 118 until completion of the upward stroke of the transport piston 106.

When valve 120 is engaged and opened, air passes through a line 216, through the valve 150, and to the shuttle of valve 174, allowing line pressure to pass from line 204 and through a line 218 to the container transport cylinder 138. This causes mechanism 152 to move to the left, as viewed in FIG. 15, through an advance stroke to thereby move another container 34 into position under the guide assembly 26. As soon as the advance stroke is completed, bracket 146 engages and opens the valve 148. Mechanism 152 is immediately moved through a retraction stroke, and kept in retracted position until valve 150 is again supplied with air upon completion of the upward stroke of transport piston 106.

Referring now to FIGS. 16–21, there is illustrated a second embodiment of the present invention, designated generally by the numeral and subscript 20a. Subscript letters are used to indicate that the designated device or element is similar but not identical to the corresponding device or element of the first embodiment. If the device or element is the same in both embodiments, then the numerals used are the same.

The major differences between the two embodiments rest in the adjustability of the back plate, designated 44a in the second embodiment, and in the provision of a new banding or sleeving advance or feed mechanism 220.

Figures 16, 17, 18, 19, 20, 21:
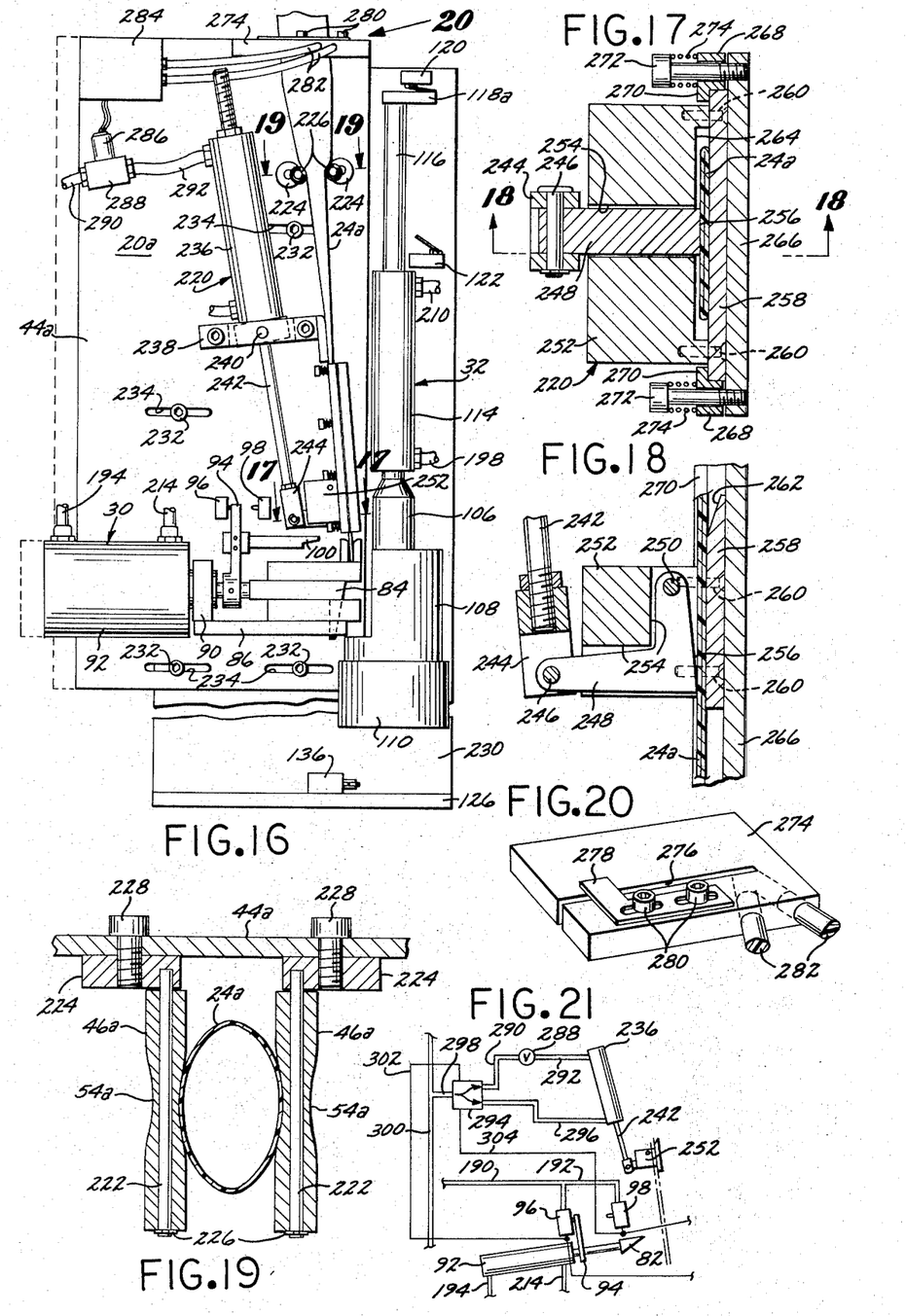
FIG. 16 is a front elevational view similar to FIG. 1, but illustrating another embodiment of the present banding apparatus.
FIG. 17 is an enlarged view taken along the line 17—17 of FIG. 16.
FIG. 18 is a view taken along the line 18—18 of FIG. 17.
FIG. 19 is an enlarged view taken along the line 19—19 of FIG. 16.
FIG. 20 is an enlarged detail perspective view of the area indicated by the arrow and numeral 20 in FIG. 16.
FIG. 21 is a diagrammatic view similar to FIG. 15, illustrating the differences between the control systems of the embodiments of FIGS. 1 & 16.

The adjustable back plate 44a makes it possible to quickly convert the apparatus 20a from the cutting and mounting of bands of one diameter to the cutting and mounting of bands of another diameter. More particularly, assuming that the apparatus 20a is to be converted or adjusted to handle the banding of bottles having a larger diameter neck, the larger banding sleeve 24a is mounted to feed between two modified pinch rollers 46a, as best seen in FIGS. 16 and 19. A larger ball (not shown) is inserted within the sleeve 24a to handle the large size, and the rollers 46a are next adjusted to also accommodate the larger size sleeve 24a.

The rollers 46a are rotatable about shafts 222 which are rigidly mounted at their inner ends within suitable openings provided in offset relation in a pair of mounting collars 224, respectively. The opposite or outer ends of the shafts 222 each carry a retaining fitting 226 seated within a peripheral end groove to retain the associated roller 46a on its shaft 222.

Each collar 224 is mounted by an Allen screw 228 to the back plate 44a. By loosening one or both of the screws 228, the associated collars 224 can be rotated about the axes of the screws 228 to thereby locate the shafts 222 closer together or farther apart. In the present example this would be farther apart to accommodate the larger banding sleeve 24a.

In the second embodiment the elements 120, 122, 116, 114, 106, 108, 110 and 136 are mounted to a vertically oriented fixed plate 230 located behind the back plate 44a and mounted at its bottom edge to the plate 126. In contrast to the first embodiment, the back plate 44a is adjustable in its lateral position. It is mounted to the fixed plate 230 by four Allen screws 232 which extend through transverse slots 234 provided in the back plate 44a. By loosening the screws 232 the plate 44a can be moved to the left to accommodate the larger banding sleeve 24a. Of course, the screws 232 are retightened when the relocation is complete.

The larger banding sleeve 24a would also require that the piston 106 and sleeves 108 and 110 can be replaced with appropriate, larger sizes, as will be apparent.

The foregoing adjustments do not alter the operation of the apparatus 20a once the adjustments are made. However, the provision for such adjustments makes it possible to use the present apparatus with banding sleeves of various sizes, without having to have the equipment out of operation for very long.

The different feed mechanism 220 of the second embodiment is preferred where the banding sleeve 24a carries advertising material or instructions or the like which must be cut at a particular place to have a complete legend or message on each cut band 38. In the first embodiment the feed means 28 was operated as a part of the transport means 32. Consequently, adjustment of one would undesirably affect the other. Moreover, the nature of the toothed feed of the feed rollers 58 and 60, and the unsupported length of the banding sleeve below the rollers, did not positively insure shearing of the sleeve by the blade 100 at exactly the right place.

In the embodiment of FIG. 16 the feed mechanism 222 is substituted for the feed means 28 and comprises, generally, a double-acting air cylinder 236 which is pivotally mounted at its lower extremity to a bracket 238 by a transverse pin 240. The bracket 238 is secured to the back plate 44a by a pair of Allen screws and includes sufficient clearance for the cylinder 236 to pivot about the pin 240.

A piston rod 242 connected to the piston of the cylinder 236 is threadably mounted at its lower end to a U-shape bracket 244, as best seen in FIGS. 17 and 18. The bracket 244 is pivotally secured by a pin 246 to the outward extremity of one leg of a right angularly shaped elbow 248. The upward extremity of the other leg of the elbow is pivotally mounted by a pin 250 to a slide block 252.

As best seen in FIG. 17 the elbow 248 is disposed within a central slot 254 in the block 252 so that when the pin 246 is moved down by the piston rod 242, the elbow mid portion 256 is moved to the right for engagement with the banding sleeve 24a, as will be seen.

The slide block 252 is secured to a slide plate 258 by a plurality of machine screws 260. As best viewed in FIG. 18, the upper edge of the slide plate 258 includes a sloped portion 262 to facilitate entry of the banding sleeve 24a between the slide block 252 and the slide plate 258. The banding sleeve 24a is downwardly movable through a substantially vertically extending channel or recess 264 formed in the block 252. The recess 264, in conjunction with the adjacent face of the slide plate 258, forms a guideway for the banding sleeve 24a as it is moves toward the cut-off means 30.

The slide block 252 and slide plate 258 constitute a slide assembly which slides vertically over the face of a fixed, generally vertically extending plate 266 fixedly attached at its edge to the plate 230. The slide plate 258 is slightly longer than the block 252, extending above and below the block 252, as seen in FIG. 18. A pair of guide channels 268 adjacent the extending edge portions of the plate 252 each include an overlying flange 270 which slidably bears against the adjacent edge portion of the slide plate 258. Each of the guide channels 268 includes openings which slidably receive Allen screws 272 threadedly mounted to the back plate 266. A plurality of compression springs 274 are disposed between the Allen screw heads and the channels 268 to bias the channels toward the slide plate 258.

With the foregoing arrangement, the banding sleeve 24a passes through the recess 264 and is periodically engageable by the elbow mid portion 256 for downward advancement. That is, when the slide block 252 is located at the top of the plate 266, the cylinder 236 is actuated to extend the piston rod 242. This downwardly moves the slide block 252 and the slide plate 258 with the banding sleeve 24a clamped between them. At the bottom of the stroke, the slide block 252 is located adjacent the bottom of the back plate 266, and opposite actuation of the cylinder 236 then retracts the piston rod 242. This releases the clamping force of the elbow 248 upon the banding sleeve 24a, so that the banding sleeve 24a does not move back up with the slide block 252. Thus, the banding sleeve 24a is advanced a predetermined amount each time the cylinder 236 is actuated to extend the piston rod 242.

Actuation of the feed cylinder 236 is controlled to occur at precisely the right time. This is important in those instances where the banding sleeve 24a includes printed material which must be complete on each cut band 38 placed on the container being banded. The printed material could be, for example, a trademark which one would not want to cut in half because of imprecise control of the feed cylinder actuation. It is common to provide a plurality of dark transverse lines or strips between each complete printed item or legend on the bands. These constitute registration marks which are sensed by various prior art devices to initiate associated control equipment. One such device is used in the present apparatus.

Assuming that the banding sleeve 24a is provided with registration marks between the separate items of printed material, a horizontal guide plate 274, as best seen in FIGS. 16 and 20, is attached to the back plate 44a to act as a guide for the sleeve. The plate 274 includes a transverse slot 276 through which the banding sleeve 24a is passed. The open end of the slot 276 is closed by one leg of an L-shaped bracket 278 which is secured to the plate 274 by a pair of Allen screws 280. The screws 280 are disposed through transverse slots in the bracket 278 so that the bracket 278 can be adjusted in lateral position to accommodate various widths of banding sleeve 24a.

With particular reference to FIG. 20, the sleeve 24a passes through the slot 276 in such an orientation that the registration marks (not shown) are to the right at the innermost end of the slot 276. In this area is located the apex of a pair of divergent passages provided in the plate 274, the apex opening through the side wall of the slot 276. A pair of light-conducting elements 282 are located in these passages so that light emitted from one is reflected off the opposite wall of the slot 276 to the other element 282.

The elements 282 are connected to a light-sensitive switch assembly 284 operative to apply electrical current to a solenoid 286. Energization of the solenoid 286 opens an air valve 288 to allow air under pressure to pass from an air line 290, through another air line 292, to the upper end of the cylinder 236 to extend the piston rod 242.

The optical system which includes the elements 282 and light sensitive switch assembly 284 is well known in the art and therefore will not be described in detail. In general, the assembly 284 includes a light source, and this light is carried along one of the light conducting elements 282. The light reflects off the opposite wall of the slot 276 to the other light conducting elements 282, and this is carried back to the assembly 284. When reflection occurs, the assembly is in one electrical state. When reflection does not occur, as when a registration mark (not shown) overlies the portion of the slot wall off which the light would otherwise reflect, then the assembly 284 is transformed into a different electrical state which causes an electric current to be supplied to the solenoid 286 to deactuate the air valve 288, as well known to those skilled in the art.

The operation of the embodiment shown in FIGS. 16–21 is identical in most respects to the operation of the embodiment of FIG. 1, except for the operation of the feed mechanism 220. This occurs independently of the operation of the transport means 32. These differences in operation are best seen in a comparison of the diagrammatic illustrations of FIGS. 15 and 21.

The cut-off cylinder 92 illustrated in FIG. 21 is identical in operation compared to its operation in the embodiment of FIG. 15, but it is illustrated again in FIG. 21 because actuation of the limit switches 96 and 98 associated with it is also effective to initiate operation of the feed cylinder 236.

One of the discharge outlets of a shuttle valve 294 is connected by the air line 290, the valve 288, and the air line 292 to the upper extremity of the feed cylinder 236. The other discharge outlet of the shuttle valve 294 is connected by an air line 296 to the opposite or lower extremity of the valve 236. The inlet opening of the shuttle valve 294 is connected by an air line 298 to an air line 300 which is connected to the source of line pressure 168.

The shuttle valve 294 is identical to the shuttle valves 172, 174, and 176 previously described in connection with the embodiment of FIG. 15. That is, pilot air pressure through pilot lines 302 or 304, which are connected to opposite sides of the shuttle valve 294, is effective to operate or move the internal shuttle valve between one position, in which the main air pressure is routed by the valve 294 through the outlet line 290 or, in the other position, through the discharge line 296. Therefore, depending upon whether pilot pressure is applied through the line 302 or the line 304, air pressure from the shuttle valve 294 passes to either the upper or the lower extremities of the cylinder 236.

The pilot line 304 is connected to limit switch 98, while the other pilot line 302 is connected to limit switch 96. Consequently, in that portion of the previously described operating cycle when the cut-off blade 82 is in its retracted position, actuation of the limit switch 96 causes pilot pressure to also be applied to the shuttle valve 294 to route pressure through air line 292. This moves the piston rod 242 of the cylinder 236 in a downward direction through a feed stroke.

Conversely, each time the cut-off blade 82 completes a cut-off or extension stroke, the actuation of the limit switch 98 also applies pilot pressure through the line 304 to the opposite side of the shuttle valve 294. This applies line pressure through the line 296 to the cylinder 236, causing piston rod 242 to move in a retraction or up stroke.

From the foregoing, it is seen that the present banding apparatus 10 is uniquely adapted to utilize flat banding sleeve 24, cutting the sleeve into bands 34 and transporting the bands downwardly and onto containers, all in timed relation with apparatus for advancing the containers into position for banding. In one embodiment the sleeve feeding and band transport mechanism are operated together through a common interconnection, while in another embodiment the sleeve feeding mechanism is independently controllable to allow very precise timing of the cutting of the banding sleeve, but without affecting the timing of the band transport portion of the operating cycle.

Various other modifications and changes may be made with regard to the foregoing detailed description without departing from the spirit of the invention of the scope of the following claims.

I claim:

1. Banding apparatus comprising:
forming means for receiving and opening a flattened banding sleeve, said forming means including a pair of opposed, spaced apart pinch rollers for location on opposite sides of said sleeve, and a ball for location within said sleeve and above said rollers, said ball having a diameter greater than the space between said rollers, whereby the opposed creases in the sleeve may be engaged between said rollers and said ball to reshape said sleeve into an approximately cylindrical configuration;
a guide assembly having a generally cylindrical guide chamber;
feed means actuable to advance a predetermined length of said sleeve from said forming means to a position laterally adjacent said guide chamber;
cut-off means actuable to cut said predetermined length of said sleeve and transport it into said guide chamber; and
transport means actuable to engage and advance said cut length from said guide chamber and onto a container.

2. Banding apparatus according to claim 1 wherein said feed means is actuable to advance said predetermined length of sleeve in a flattened state, and said cut-off means includes a cutting portion operative to cut a half-tab in said sleeve whereby a full tab is defined when said sleeve is opened to a substantially cylindrical configuration.

3. Banding apparatus according to claim 2 wherein said cut-off means further includes a supplemental cutting portion operative to cut a notch adjacent said half-tab whereby the opened sleeve is characterized by a pair of notches adjacent said full tab.

4. Banding apparatus according to claim 2 wherein said feed means includes serrating means to form an axial row of serrations in said sleeve adjacent said half tab.

5. Banding apparatus comprising:
forming means for receiving and opening a flattened banding sleeve;
a guide assembly having a generally cylindrical guide chamber;
feed means actuable to advance a predetermined length of said sleeve from said forming means to a position laterally adjacent said guide chamber;
cut-off means actuable to cut said predetermined length of said sleeve and transport it into said guide chamber; and
transport means actuable to engage and advance said cut length from said guide chamber and onto a container.

6. Banding apparatus according to claim 5 and including control means coupled between said cut-off means and said transport means and operative to disable said feed means until said cut-off means has transported said sleeve length into said guide chamber.

7. Banding apparatus according to claim 5 wherein said forming means includes means for reversely bending the edge creases of said flattened sleeve whereby said predetermined length of said sleeve in said guide chamber tends to expand and frictionally engage the walls of said guide chamber to maintain its position prior to actuation of said transport means.

8. Banding apparatus according to claim 5 and including container advancing means adjacent said guide assembly and operative to move successive containers into position below said guide chamber; and further including control means coupled between said container advancing means and said transport means and operative to disable said container advancing means until said transport means has advanced said cut length.

9. Banding apparatus according to claim 5 wherein said feed means and said transport means are coupled together whereby said feed means is operative to advance said predetermined length of said sleeve simultaneously with retraction of said transport means.

10. Banding apparatus according to claim 5 wherein said guide assembly includes an inner sleeve defining said guide chamber, an outer sleeve axially slidably receiving said inner sleeve, and bias means biasing said inner sleeve upwardly, said transport means including a transport piston frictionally engagable with the walls of said guide chamber sufficiently to carry said inner sleeve downwardly against the bias of said bias means, upon actuation of said transport means, for light engagement of said inner sleeve with a container to be banded.

11. Banding apparatus according to claim 5 wherein said forming means, feed means, and cut-off means are mounted upon a first support structure; and said guide assembly and transport means are mounted upon a second support structure, and said first and second support structures are adjustably movable relative to each other whereby handling of sleeves of different sizes can be facilitated.

12. Banding apparatus according to claim 5 wherein said feed means comprises a pressure cylinder having a piston rod extensible upon actuation of said pressure cylinder; a slide assembly having a recess through which said sleeve can extend, and including a portion coupled to said piston rod and movable toward clamping engagement with said sleeve upon said actuation of said pressure cylinder, whereby said sleeve may be clamped for slidable movement with said slide assembly responsive to said actuation of said pressure cylinder.

13. Banding apparatus according to claim 12 and including optical means coupled to said feed means and operative in response to registration marks upon said banding sleeve to deactuate said pressure cylinder.

* * * * *